United States Patent
Wong et al.

(10) Patent No.: US 8,918,361 B2
(45) Date of Patent: Dec. 23, 2014

(54) METHODS AND SYSTEMS FOR RECURSIVE SAVING OF HIERARCHICAL OBJECTS TO A DATABASE

(71) Applicants: Simon Y. Wong, San Carlos, CA (US); Walter Macklem, San Francisco, CA (US); Lars Hofhansl, San Francisco, CA (US); Varadarajan Rajaram, San Francisco, CA (US); Eric Bezar, Oakland, CA (US)

(72) Inventors: Simon Y. Wong, San Carlos, CA (US); Walter Macklem, San Francisco, CA (US); Lars Hofhansl, San Francisco, CA (US); Varadarajan Rajaram, San Francisco, CA (US); Eric Bezar, Oakland, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 14/036,457

(22) Filed: Sep. 25, 2013

(65) Prior Publication Data
US 2014/0025642 A1    Jan. 23, 2014

Related U.S. Application Data

(60) Division of application No. 12/727,464, filed on Mar. 19, 2010, now Pat. No. 8,548,942, which is a continuation-in-part of application No. 11/678,500, filed on Feb. 23, 2007, now Pat. No. 8,161,010.

(60) Provisional application No. 60/849,693, filed on Oct. 4, 2006.

(51) Int. Cl.
G06F 7/00     (2006.01)
G06F 17/00    (2006.01)
G06F 11/14    (2006.01)
G06F 17/30    (2006.01)

(52) U.S. Cl.
CPC ...... *G06F 11/1402* (2013.01); *G06F 17/30377* (2013.01)
USPC .......................................................... 707/609

(58) Field of Classification Search
CPC ............................................... G06F 17/30008
See application file for complete search history.

(56) References Cited

U.S. PATENT DOCUMENTS

| | | |
|---|---|---|
| 4,498,145 A | 2/1985 | Baker et al. |
| 4,503,535 A | 3/1985 | Budde et al. |
| 4,933,848 A | 6/1990 | Haderle et al. |
| 4,945,474 A | 7/1990 | Elliott et al. |
| 4,947,320 A | 8/1990 | Crus et al. |
| 5,170,480 A | 12/1992 | Mohan et al. |
| 5,291,583 A | 3/1994 | Bapat |
| 5,293,615 A | 3/1994 | Amada |
| 5,313,629 A | 5/1994 | Abraham et al. |
| 5,455,944 A | 10/1995 | Haderle et al. |

(Continued)

OTHER PUBLICATIONS

Office Action for U.S. Appl. No. 14/061,647, mailed Jan. 2, 2014, 14 pages.
Final Office Action for U.S. Appl. No. 11/678,477 dated Mar. 2, 2011, 14 pages.

(Continued)

*Primary Examiner* — Ajay Bhatia
*Assistant Examiner* — Jessica N Le
(74) *Attorney, Agent, or Firm* — Blakely, Sokoloff, Taylor & Zafman

(57) ABSTRACT

Methods and systems include embodiments that recursively save parent, grandparent, and other records in a database that depend from a record. User-provided code within a save event or trigger can thus call further save methods without corrupting the database. Junction objects, objects that reflect records with two or more parents, can also be recursively saved.

24 Claims, 14 Drawing Sheets

(56) References Cited

U.S. PATENT DOCUMENTS

| | | |
|---|---|---|
| 5,560,038 A | 9/1996 | Haddock |
| 5,566,330 A | 10/1996 | Sheffield |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,752,018 A | 5/1998 | Sheffield |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,872,990 A | 2/1999 | Luick et al. |
| 5,873,096 A | 2/1999 | Lim et al. |
| 5,918,159 A | 6/1999 | Fomukong et al. |
| 5,937,415 A | 8/1999 | Sheffield et al. |
| 5,950,210 A | 9/1999 | Nelson |
| 5,963,953 A | 10/1999 | Cram et al. |
| 6,067,542 A | 5/2000 | Carino, Jr. |
| 6,070,165 A | 5/2000 | Whitmore |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,185,577 B1 | 2/2001 | Nainani et al. |
| 6,189,011 B1 | 2/2001 | Lim et al. |
| 6,216,135 B1 | 4/2001 | Brodersen et al. |
| 6,233,585 B1 | 5/2001 | Gupta et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,304,876 B1 | 10/2001 | Isip, Jr. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,374,236 B1 | 4/2002 | Chen et al. |
| 6,377,959 B1 | 4/2002 | Carlson |
| 6,393,605 B1 | 5/2002 | Loomans |
| 6,405,220 B1 | 6/2002 | Brodersen et al. |
| 6,427,143 B1 | 7/2002 | Isip et al. |
| 6,434,550 B1 | 8/2002 | Warner et al. |
| 6,446,089 B1 | 9/2002 | Brodersen et al. |
| 6,453,314 B1 | 9/2002 | Chan et al. |
| 6,480,848 B1 | 11/2002 | DeKimpe et al. |
| 6,493,826 B1 | 12/2002 | Schofield et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,615,220 B1 | 9/2003 | Austin et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,714,943 B1 | 3/2004 | Ganesh et al. |
| 6,724,399 B1 | 4/2004 | Katchour et al. |
| 6,728,702 B1 | 4/2004 | Subramaniam et al. |
| 6,728,747 B1 | 4/2004 | Jenkins et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,155 B1 | 8/2004 | Stegelmann |
| 6,782,383 B2 | 8/2004 | Subramaniam et al. |
| 6,792,462 B2 | 9/2004 | Bernhardt et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,859,926 B1 | 2/2005 | Brenner et al. |
| 6,920,467 B1 | 7/2005 | Yoshimoto |
| 7,103,597 B2 | 9/2006 | McGoveran |
| 7,281,023 B2 | 10/2007 | Lou |
| 7,340,411 B2 | 3/2008 | Cook |
| 7,373,548 B2 | 5/2008 | Reinhardt et al. |
| 7,376,675 B2 | 5/2008 | Pruet, III |
| 7,383,246 B2 | 6/2008 | Lohman et al. |
| 7,509,535 B1 * | 3/2009 | Gulve et al. ............ 714/43 |
| 7,620,655 B2 | 11/2009 | Larsson et al. |
| 7,647,360 B2 | 1/2010 | Kano |
| 7,685,188 B2 | 3/2010 | Copeland et al. |
| 7,792,885 B2 | 9/2010 | Piper et al. |
| 8,145,686 B2 | 3/2012 | Raman et al. |
| 8,548,952 B2 * | 10/2013 | Weissman et al. ............ 707/661 |
| 2001/0044791 A1 | 11/2001 | Richter et al. |
| 2002/0007363 A1 | 1/2002 | Vaitzblit |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0032678 A1 | 3/2002 | Cornwell et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0091718 A1 | 7/2002 | Bohannon et al. |
| 2002/0103663 A1 | 8/2002 | Bankier et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0101194 A1 | 5/2003 | Rys et al. |
| 2003/0120675 A1 | 6/2003 | Stauber et al. |
| 2003/0151633 A1 | 8/2003 | George et al. |
| 2003/0154197 A1 | 8/2003 | Millet et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015851 A1 | 1/2004 | Newhook et al. |
| 2004/0015981 A1 | 1/2004 | Coker et al. |
| 2004/0027388 A1 | 2/2004 | Berg et al. |
| 2004/0078683 A1 | 4/2004 | Buia et al. |
| 2004/0128001 A1 | 7/2004 | Levin et al. |
| 2004/0172385 A1 | 9/2004 | Dayal |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |

(56) References Cited

U.S. PATENT DOCUMENTS

| | | |
|---|---|---|
| 2004/0199543 A1 | 10/2004 | Braud et al. |
| 2004/0203686 A1 | 10/2004 | Bahr |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004918 A1 | 1/2005 | Platt |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0097078 A1 | 5/2005 | Lohman et al. |
| 2005/0097149 A1 | 5/2005 | Vaitzblit et al. |
| 2005/0165818 A1 | 7/2005 | Cole et al. |
| 2005/0182785 A1 | 8/2005 | Oswalt |
| 2005/0234842 A1 | 10/2005 | Lau et al. |
| 2005/0283485 A1 | 12/2005 | Blaicher et al. |
| 2006/0031270 A1 | 2/2006 | Nemoto et al. |
| 2006/0041584 A1 | 2/2006 | Debertin et al. |
| 2006/0101401 A1 | 5/2006 | Brumme et al. |
| 2006/0206534 A1 | 9/2006 | Banks et al. |
| 2006/0212436 A1 | 9/2006 | Gupta et al. |
| 2006/0282456 A1 | 12/2006 | Kapoor et al. |
| 2007/0050417 A1 | 3/2007 | Hasegawa et al. |
| 2007/0061279 A1 | 3/2007 | Christiansen et al. |
| 2007/0083573 A1 | 4/2007 | Gillespie |
| 2007/0143741 A1 | 6/2007 | Harris |
| 2007/0162969 A1 | 7/2007 | Becker |
| 2007/0168720 A1 | 7/2007 | Chatterjee et al. |
| 2007/0168758 A1 | 7/2007 | Kolb et al. |
| 2007/0168958 A1 | 7/2007 | Huang et al. |
| 2007/0174838 A1 | 7/2007 | Cotner et al. |
| 2007/0239797 A1 | 10/2007 | Cattell et al. |
| 2008/0052680 A1 | 2/2008 | Thebes et al. |
| 2008/0052720 A1 | 2/2008 | Barsness et al. |
| 2008/0120304 A1 | 5/2008 | Calio et al. |
| 2008/0294613 A1 | 11/2008 | Iyer et al. |
| 2008/0320330 A1 | 12/2008 | Archer et al. |
| 2009/0031169 A1 | 1/2009 | Bower et al. |
| 2011/0173619 A1 | 7/2011 | Fish |
| 2012/0166871 A1* | 6/2012 | Weissman et al. ............... 714/19 |

OTHER PUBLICATIONS

Office Action for U.S. Appl. No. 11/678,500 dated May 28, 2008, 9 pages.
Office Action for U.S. Appl. No. 11/678,500 dated Jan. 29, 2009, 13 pages.
Final Office Action for U.S. Appl. No. 11/678,500 dated Oct. 26, 2009, 14 pages.
Office Action for U.S. Appl. No. 11/678,500 dated May 12, 2011, 15 pages.
Office Action for U.S. Appl. No. 12/727,464 dated Sep. 13, 2012, 15 pages.
"A Survey of Rollback-Recovery Protocols in Message-Passing Systems," by Elnozahy et al. Sep. 2002, ACM vol. 34, Issue 3, 44 pages.
"Fast-Start: Quick Fault Recovery in Oracle," by Lahiri et al. Jun. 2001, ACM, 6 pages.
International Search Report and Written Opinion for Application No. PCT/US07/080341, dated Jun. 13, 2008, 7 pages.
International Preliminary Report on Patentability for Application No. PCT/US07/080341, dated Apr. 7, 2009, 6 pages.
Office Action for U.S. Appl. No. 11/678,477 dated Oct. 23, 2009, 13 pages.
Office Action for U.S. Appl. No. 11/678,477 dated Sep. 23, 2011, 18 pages.
Office Action for U.S. Appl. No. 11/678,477 dated Jun. 21, 2010, 14 pages.
Office Action for U.S. Appl. No. 11/678,477 dated Jan. 28, 2009, 9 pages.
Office Action for U.S. Appl. No. 11/678,477 dated Apr. 5, 2012, 29 pages.
Office Action for U.S. Appl. No. 13/415,403 dated Oct. 26, 2012, 12 pages.
Notice of Allowance for U.S. Appl. No. 11/678,500 dated Dec. 12, 2011, 15 pages.
Notice of Allowance for U.S. Appl. No. 12/727,464 dated May 28, 2013, 18 pages.
Notice of Allowance for U.S. Appl. No. 13/415,403 dated Jun. 12, 2013, 12 pages.
Notice of Allowance for U.S. Appl. No. 11/678,477 mailed Sep. 11, 2013, 18 pages.

* cited by examiner

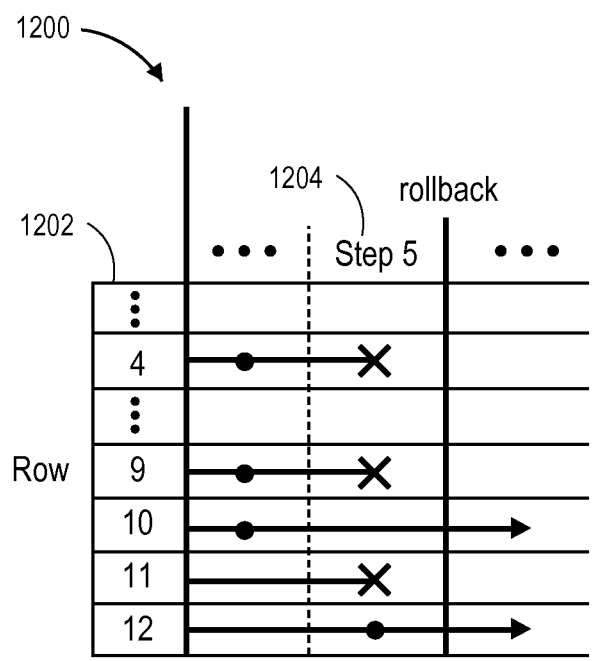
FIG. 12
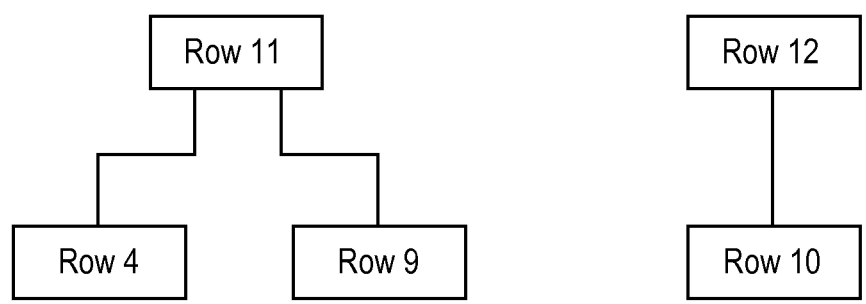
FIG. 13A    FIG. 13B

METHODS AND SYSTEMS FOR RECURSIVE SAVING OF HIERARCHICAL OBJECTS TO A DATABASE

CLAIM OF PRIORITY

This United States Divisional Patent Application is related to, and claims priority to, the Continuation-In-Part U.S. Patent Application filed on Mar. 19, 2010, entitled "METHODS AND SYSTEMS FOR RECURSIVE SAVING OF HIERARCHICAL OBJECTS TO A DATABASE," having application Ser. No. 12/727,464 and this United States Divisional Patent Application is further related to, and further claims priority to, the U.S. Patent Application filed on Feb. 23, 2007, entitled "METHODS AND SYSTEMS FOR PROVIDING FAULT RECOVERY TO SIDE EFFECTS OCCURRING DURING DATA PROCESSING," having application Ser. No. 11/678,500 and now U.S. Pat. No. 8,161,010; and this United States Divisional Patent Application is further related to, and further claims priority to, the U.S. Provisional Application filed on Oct. 4, 2006, entitled "IMPLEMENTING BOTH BULK AND ROW BASED SAVE LOGIC IN AN OBJECT RELATIONAL MAPPING LAYER AND APPLICATION," having application Ser. No. 60/849,693 and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE ART

The current invention relates generally to save mechanisms in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. During this process, data may be transformed through various formats and protocols in the various tiers of the system: from XML or HTML text to Java Objects to relational data structures and back again. In particular the latter transition is known in the industry as the O/R (object/relational) boundary and is the subject of much developer headache and 3rd party development tool support (because the representation one uses typically in a procedural language like Java, for a complex object, is typically quite different from the optimal manner in which that data is stored and indexed in a relational database (which is the dominant location for enterprise data of this sort)).

Unfortunately, conventional 3rd party approaches to lower-level O/R processing do not support save operations performed in bulk, becoming inefficient if, for example, the number of items to be saved to the database system is relatively high.

Accordingly, it is desirable to provide techniques enabling an API of the database system to improve performance and provide greater robustness of the database system.

Furthermore, it is desirable to increase flexibility of user-provided code and save routines while maintaining robustness of the database system.

BRIEF SUMMARY

In accordance with embodiments, there are provided mechanisms and methods for saving multiple rows together through an object relational mapping layer to a database. These mechanisms and methods for saving multiple rows together can enable embodiments to detect faults in the save operation(s) and recover. The ability of embodiments to detect faults in the save operation(s) and recover can enable embodiments to provide a robust forgiving published API that saves a set of rows together whenever possible.

In an embodiment and by way of example, a method for saving multiple rows together through an object relational mapping layer to a database is provided. The method embodiment includes receiving, at an API in a known start state, a set of rows to save together. The set of rows is saved together until each row in the set of rows has been saved. A new set of rows is formed from the set of rows by removing rows associated with faulting during saving. The saving and forming can be repeated using the new set of rows until a set of rows that can be saved from the known start state without fault is determined. When a set of rows that can be saved from the known start state without fault is determined, then the set of rows may be committed.

In another embodiment and again by way of example, a method for providing fault recovery to side effects occurring during data processing is provided. The method embodiment includes detecting a fault in processing a set of rows of a database. At least one of the set of rows includes at least one side effect. Each of the set of rows processed can be rolled back and processing retried on a subset of the set of rows in which rows associated with faults have been removed until a subset of the set of rows in which each row of the subset of rows is able to be processed. The subset of rows may be processed to the database and the at least one side effect executed, thereby ensuring that no side effects have occurred from executing code on behalf of any rows associated with a fault.

In another embodiment and again by way of example, a method for recursively saving to a database an inserted or updated object that is part of a hierarchy is provided. The method embodiment includes receiving a value for a first record in a database, determining that a parent record of the first record has a field that is dependent on the receive value, and recursively determining that a grandparent record of the first record has a field that is dependent on the received value. The method further includes loading the first record from the database into a first object, updating, using a processor operatively coupled to a memory, the first object with the received value, and flushing the updated first object to the first record in the database. The method further includes loading the parent record from the database into a second object, updating the second object based on the received value, and flushing the updated second object to the parent record in the database. The method also includes recursively loading the grandparent record from the database into a third object, recursively updating the third object based on the received value, and recursively flushing the updated third object to the grandparent record in the database.

In another embodiment and again by way of example, a method for recursively deleting a record that is part of a hierarchy in a database is provided. The method includes receiving an instruction to delete a first record in a database, determining that a parent record of the first record has a field that is dependent on the first record, and recursively determining that a grandparent record of the first record has a field that is dependent on the first record. The method further includes loading the first record from the database into a first object, deleting the first record in the database, loading the parent record from the database into a second object, updating, using a processor operatively coupled to a memory, the second object based upon the deletion of the first record, and flushing the updated second object to the parent record in the database. The method further includes recursively loading the grandparent record from the database into a third object, recursively updating the third object based on the deletion of the first record, and recursively flushing the updated third object to the grandparent record in the database.

Embodiments can also include determining that a second parent record of the first record has a field that is dependent on the received value, such that the first record has at least to parents, loading the second parent record from the database into a fourth object, updating the fourth object based on the received value, and flushing the updated fourth object to the second parent in the database.

Embodiments can also include locking the records in the database in the order of: the grandparent record, the parent record, and then the first record.

Embodiments also include machine readable storage mediums carrying instructions and computer systems executing instructions to perform the above methods.

While the present invention is described with reference to an embodiment in which techniques for saving multiple rows together are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 12 is a flow diagram illustrating faults during steps according to an embodiment.

FIG. 13A illustrates a parent row with two child rows from FIG. 12.

FIG. 13B illustrates a parent row with one child row from FIG. 12.

DETAILED DESCRIPTION

General Overview

Figure 1:
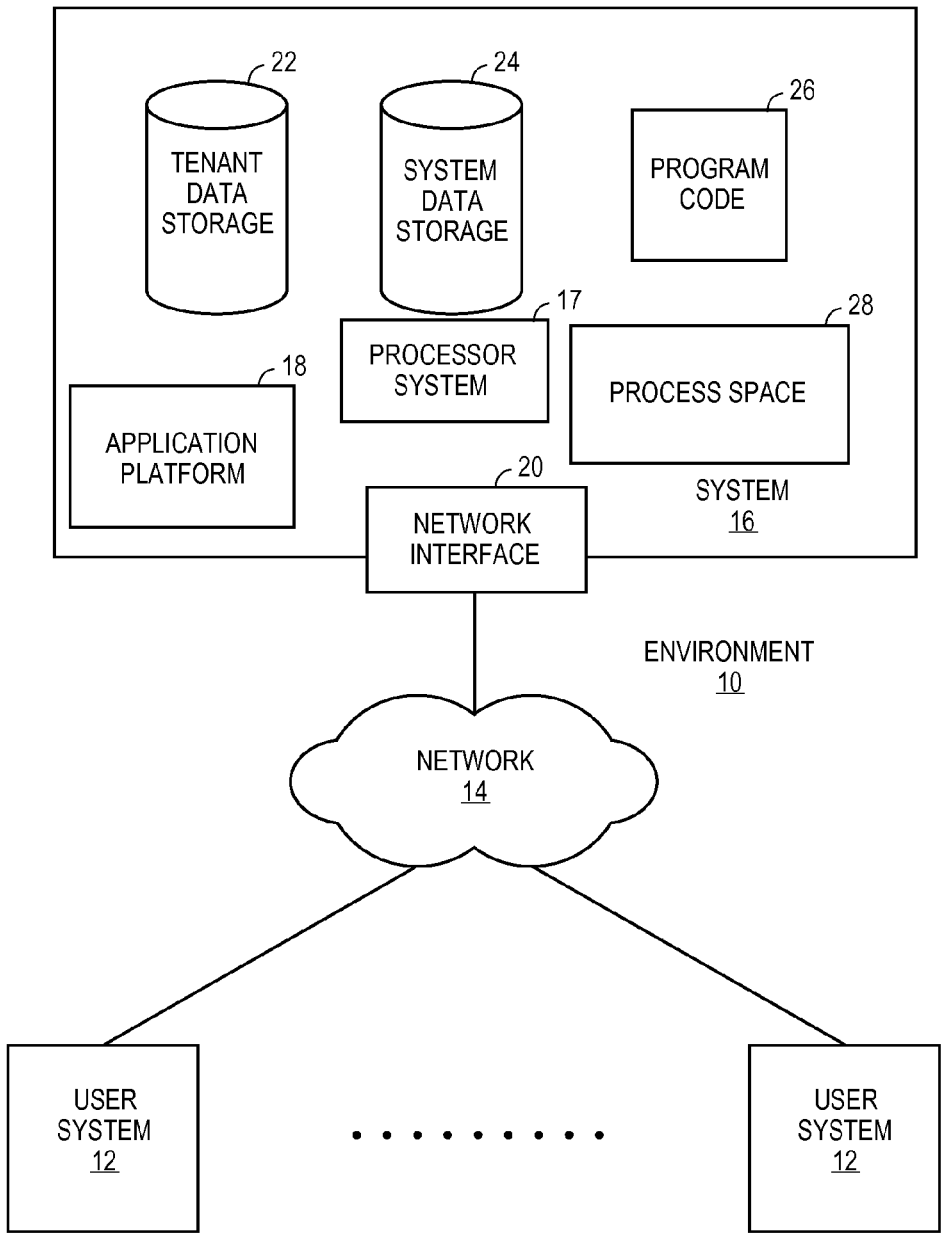
FIG. 1 illustrates a block diagram of an example of an environment wherein an on-demand database service might be used.

Systems and methods are provided for saving multiple rows together through an object relational mapping layer to a database. Saving multiple rows together can enable embodiments to detect faults in the save operation(s) and recover. Embodiments may recover from faults by forming a new set of rows by removing rows associated with faulting save operations and repeating the saving and forming operations using the new set of rows until a set of rows that can be saved from the known start state without fault is determined. When the subset of successful rows is found, embodiments are able to provide assurance that no side effects (i.e., code or operations triggered by saving of a data to a particular location) have been executed on behalf of any of the failed rows (side effects from custom Apex code included) by deferring execution of triggers until an entire set of rows can be saved and committed.

A "rollback" is a process in which a database is set to a previous save point. For example, after a save point is set in a database, further operations by the user or processes may risk corrupting the database or putting incorrect, undesirable data into the database. A rollback may be commanded such that the database abandons all the work that has been done and loads the save point. This can occur before the undesirable data is committed to the database.

When a rollback of save operations occurs responsive to a fault detected in one or more save operations, a whole service notion of rollback—including rollback of governor limits (i.e., limits placed on resource usage)—can be performed. Rollback of an entire service provides a simple and easy to understand programming model to the user because users do not need to worry about the retry logic itself using up resource limits in unpredictable ways.

Embodiments process data from clients using a bulk array for efficiency and speed, including techniques in multiple programming environments and languages. As an example, a client-side Simple Object Access Protocol (SOAP) API embodiment saves can be specified as arrays of objects to encourage efficient use of Internet round trips.

Some embodiments can recursively save to a database an inserted or updated object that is part of a hierarchy. The recursion can occur such that a parent, grandparent, great-grandparent, etc. record that has dependencies on the object will update correctly. The recursion can occur such that a child, grandchild, great-grandchild, etc. record that has dependencies on the object will update robustly.

Some embodiments can recursively delete a record that is part of a hierarchy in a database. The recursion can occur such that a parent, grandparent, great-grandparent, etc. record and child, grandchild, great-grandchild, etc. record that has dependencies on the object will update robustly.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for saving multiple rows together through an object relational mapping layer to a database will be described with reference to example embodiments.

System Overview

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
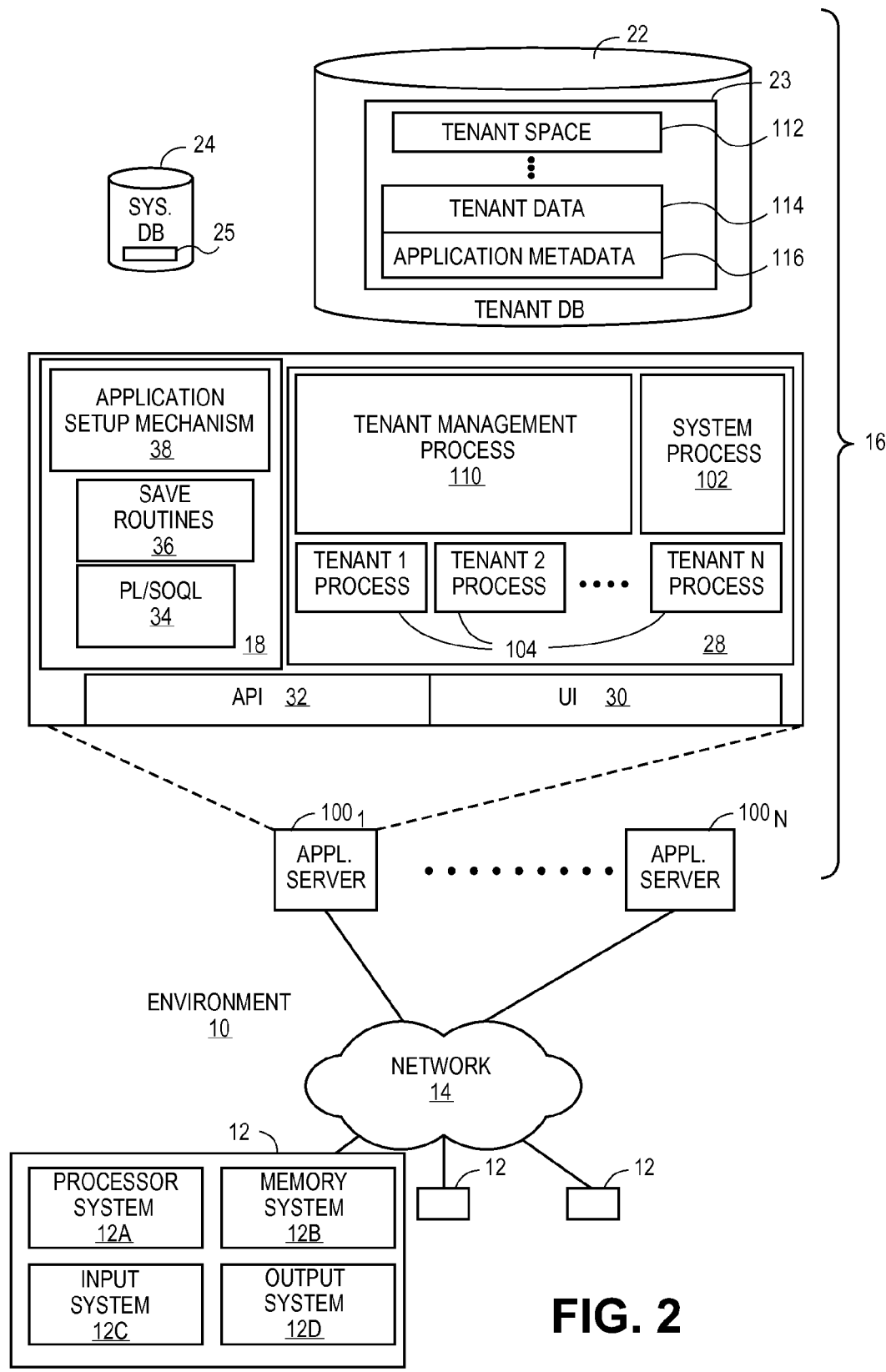
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, Apex 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using Apex 34 that provides a programming language style interface extension to API 32. A detailed description of some Apex (a.k.a. PL/SOQL) language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe a high level overview of a technique for saving multiple rows together in accordance with aspects and embodiments of the present invention. An example of detecting and recovering from failures in a save of multiple rows is then detailed. Following the example of detecting and recovering from failures, examples of some of the many types of operations that may be performed together in sets according to the techniques described herein are provided.

Figure 3A:
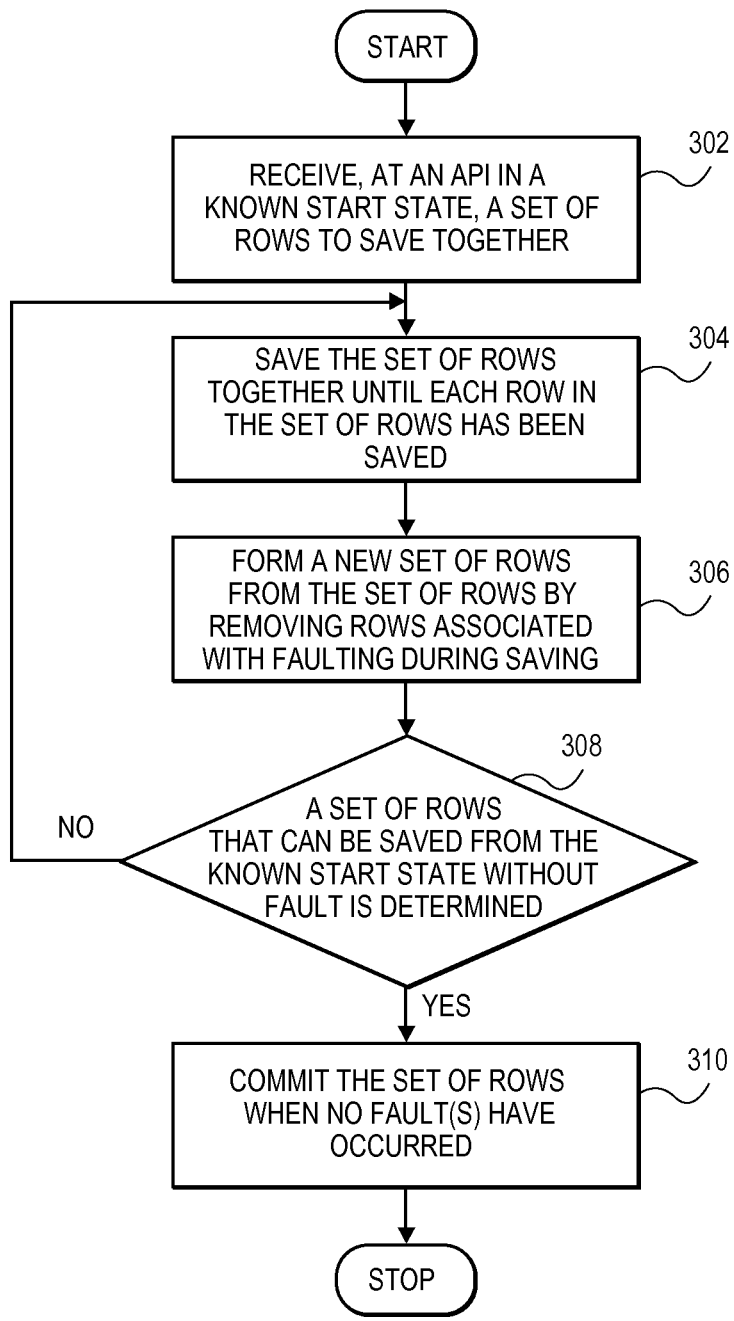
FIG. 3A illustrates an operational flow diagram of a high level overview of a technique for saving multiple rows together in an embodiment.

FIG. 3A illustrates an operational flow diagram of a high level overview of a technique for saving multiple rows together in an embodiment. In one embodiment, the technique for saving multiple rows together shown in FIG. 3A is operable with an implemented in the multi-tenant database system 16. As shown in FIG. 3A, a set of rows to save together is received (block 302) at an API in a known start state. For example and without limitation, this can include receiving information to save to a set of rows in a Simple Object Access Protocol (SOAP) transaction.

The set of rows is saved (block 304) together until each row in the set of rows has been saved. By way of example and without limitation, this can include recording fault information for any row associated with a save operation that faults. A new set of rows is formed (block 306) from the set of rows by removing rows associated with faulting during saving. In embodiments, this can include removing rows corresponding to faults from the set of rows to save together to form the new set of rows to save together.

The saving (block 304) and forming (block 306) can be repeated (block 308) using the new set of rows until a set of rows that can be saved from the known start state without fault is determined. This can include rolling back saving the set of rows to the known start state. Embodiments may roll back governor limits (i.e., resource limitations) placed upon code executing on behalf of rows that are being rolled back in order to prevent resource allocations from being used up by user's trying a procedure, detecting a failure and then rolling back the procedure in the user's code. A detailed description of governor limits in Apex language embodiments may be found in commonly owned co-pending U.S. Provisional Patent Application 60/828,757 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 9, 2006, which is incorporated in its entirety herein for all purposes.

When a set of rows that can be saved from the known start state without fault is determined, then the set of rows may be committed (block 310). By executing side effects, such as code or operations, execution is triggered by saving or other operations performed on data to certain rows only after a set of rows is successfully saved and committed. The process of determining that a set of rows can be saved without incurring a fault enables embodiments to ensure that no side effects have occurred from executing code on behalf of any rows failing to be saved.

Figure 3B:
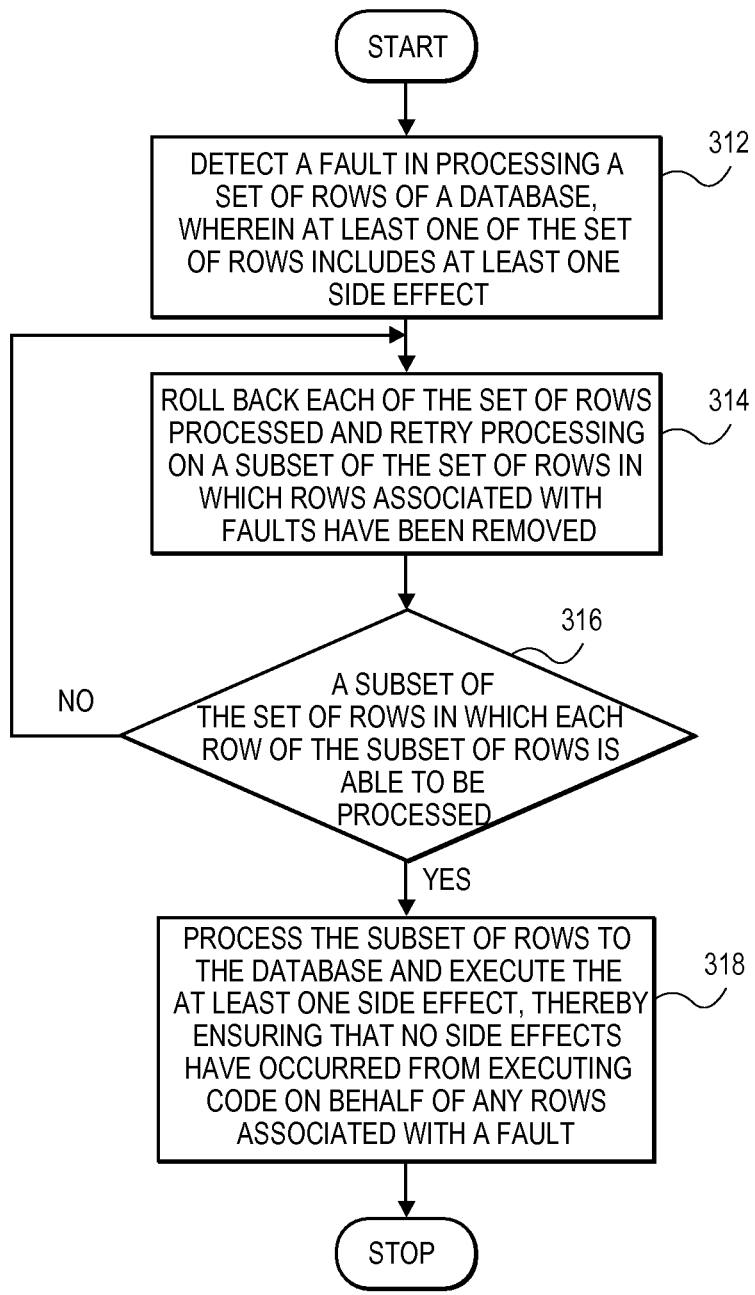
FIG. 3B illustrates an operational flow diagram of a high level overview of a technique for providing fault recovery to side effects occurring during data processing in an embodiment.

FIG. 3B is an operational flow diagram illustrating a high level overview of a technique for providing fault recovery to side effects occurring during data processing in an embodiment. A fault in processing a set of rows of a database is detected (block 312). At least one of the set of rows includes at least one side effect. For example and without limitation, this can include at least one of a pre-operation trigger, a post-operation trigger, or a code snippet. Each of the set of rows processed is rolled back (block 314), and processing is retried on a subset of the set of rows in which rows associated with faults have been removed until a subset of the set of rows in which each row of the subset of rows is able to be processed (block 316). By way of example and without limitation, this can include rolling back governor limits placed upon code executing on behalf of rows that are being rolled back. The subset of rows is processed (block 318) to the database and the at least one side effect is executed, thereby ensuring that no side effects have occurred from executing code on behalf of any rows associated with a fault. In embodiments, this can include updating resources used and checking against governor limits.

Figure 4A:
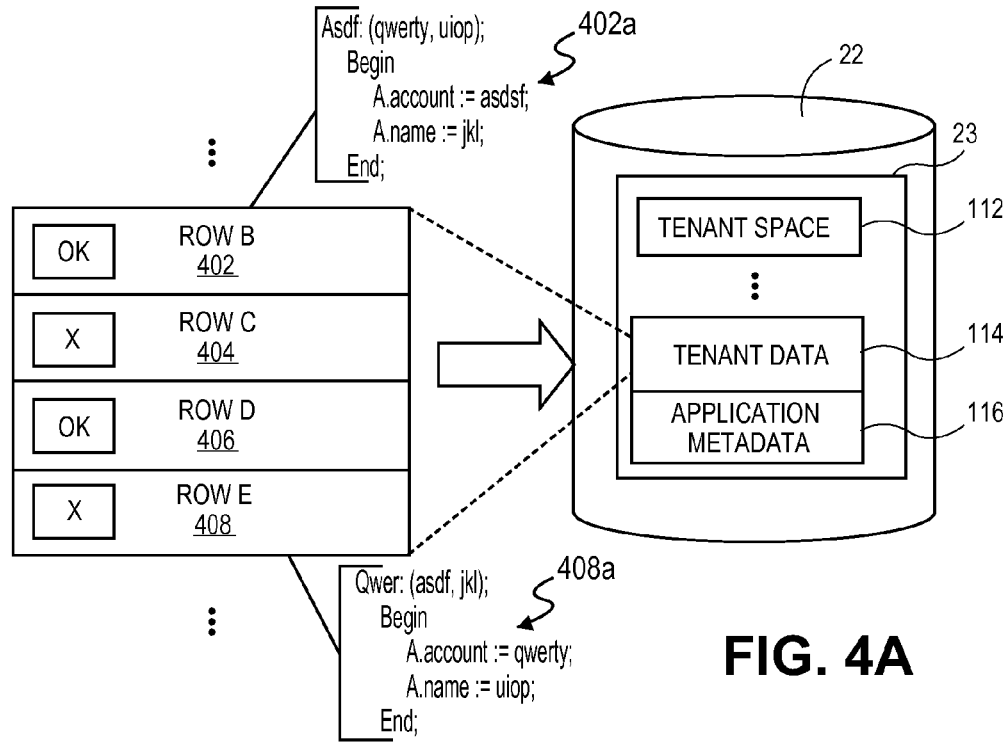
FIGS. 4A-4B illustrate block diagrams of an example of a technique for saving multiple rows together in an embodiment.
Figure 4B:
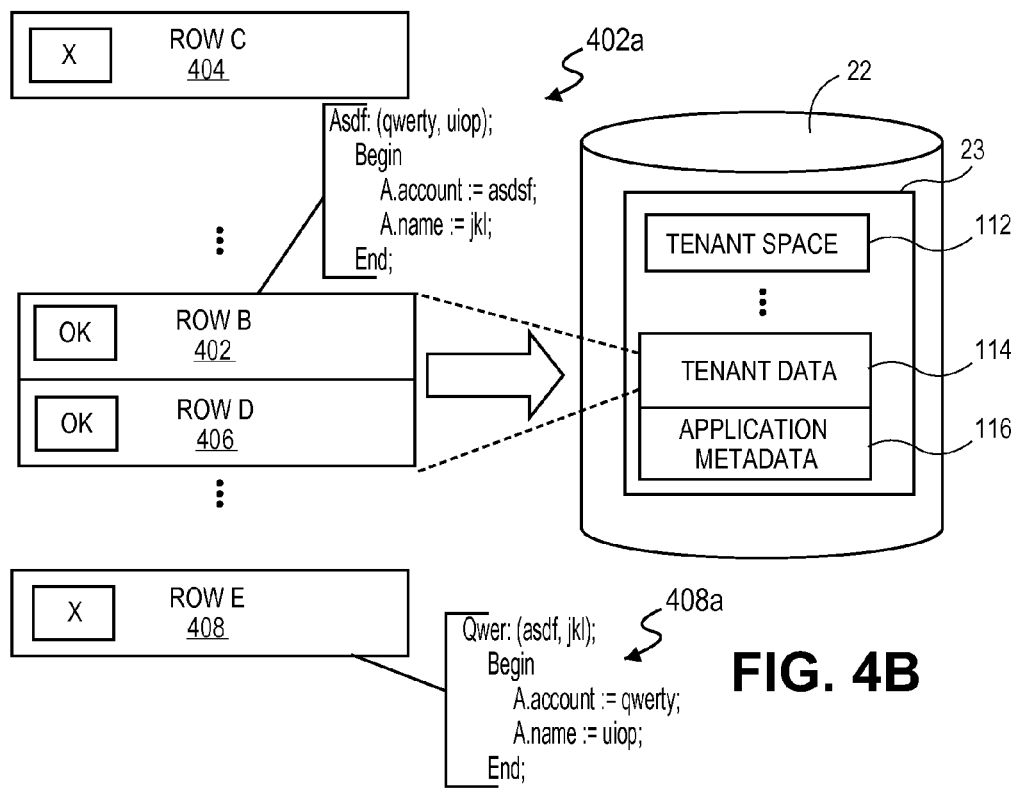

FIGS. 4A-4B illustrate block diagrams of an example of a technique for saving multiple rows together in an embodiment. In FIG. 4A, a set of rows 402-408 are to be saved together into a tenant data area 114 of database 22 of FIG. 2. Rows 402 and 408 have side effects associated with them, namely code snippet 402a is triggered to execute prior to saving row 402. Code snippet 402a could also be triggered after saving 402 or any other of a variety of trigger configurations. Similarly, row 408 includes a code snippet 408a that is triggered to execute prior to saving row 408. Again, other types of triggers could be used, but pre-saving triggers are selected for this example for illustrative purposes.

Again with reference to FIG. 4A, in an embodiment and by way of example, a first attempt to save rows 402-408 results in failure reports ("x") being returned for row C 404 and row E 408. Because one or more failure reports have been received responsive to an attempted save operation, the save operations of rows 402-408 are rolled back to the starting state. Further, any side effects 402a, 408a that were permitted to execute are also rolled back. Additionally, any resource usage counted against governor limits by executing side effects 402a, 408a is also rolled back.

Now with reference to FIG. 4B, a second attempt is made to find a block of rows that can be saved without receiving failure reports. As illustrated in FIG. 4B, row C 404 and row E 408 are removed from the set of rows that the system is attempting to save to the tenant data 114 of database 22 because row C 404 and row E 408 are associated with a prior failing save operation. Now a new set of rows, including row B 402 and row D 406 are saved to tenant data 114, resulting in good return codes ("ok"). Accordingly, the system will once again roll back the save, execute any code or operations associated with pre-save triggers corresponding to rows to be saved, such as snippet 402a, perform a save of the block of rows and then commit the saved rows. In the foregoing example, the process of determining that a set of rows can be saved without incurring a fault enables embodiments to ensure that no side effects have occurred from executing code on behalf of any rows failing to be saved.

Above, the processing of the set of rows goes through a number of steps, including validation, pre-operation triggers, post-operation triggers, and other steps. At each of these steps, faults can occur in zero or more rows. Rows can fail validations, and the running of pre-operation or post-operation triggers can fail.

At each step in the save process, after faults are detected, the set of rows is reduced to those that were successful. The smaller set of rows then proceeds to the next step. However, the existence of faults along the process is stored. At the end of the whole save process, a rollback is performed to the beginning and the whole save process is retried with only the rows that had passed through successfully (i.e. without faults or errors).

Figure 5:
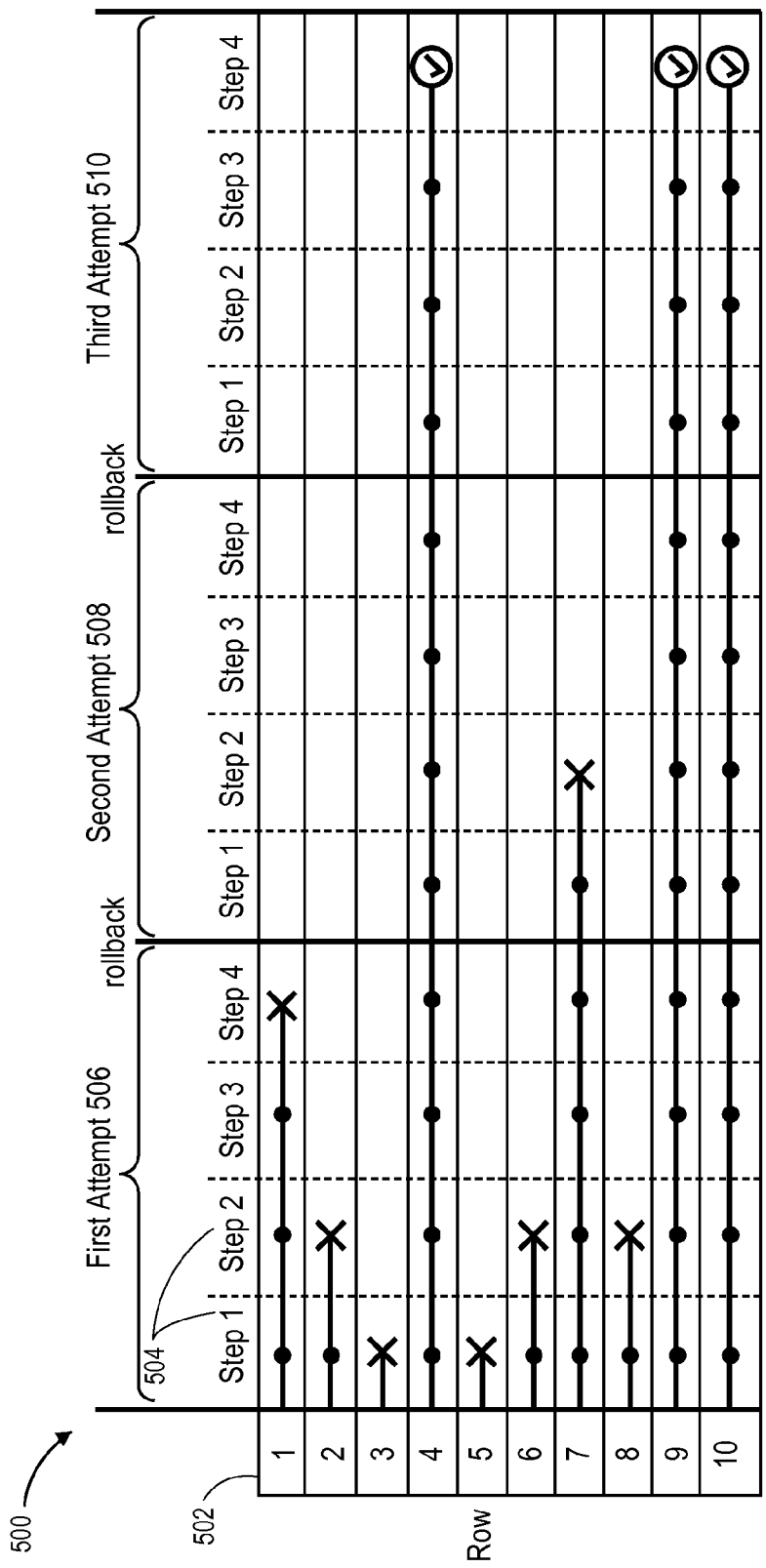
FIG. 5 is a flow diagram illustrating faults during steps according to an embodiment.

FIG. 5 is a flow diagram illustrating faults during steps according to an embodiment. Rows 502 proceed through steps 504 in a first attempt 506, second attempt 508, and third attempt 510. In this embodiment, step 1 corresponds to the running of validations, step 2 corresponds to executing the pre-operation trigger, step 3 corresponds to flushing the rows to the database, and step 4 corresponds to executing the post-operation trigger. These operations are examples only; other operations are also envisioned.

In this example, a user wishes to save rows 1 through 10. In step 1 of the first attempt, rows 3 and 5 fail. The rest of the rows (i.e. rows 1-2, 4, 6-10) proceed to step 2. In step 2, running the pre-operation trigger code snippet sets a runtime error on rows 2, 6, and 8. The rest of the rows (i.e. rows 1, 4, 7, 9-10) proceed to step 3. In step 3, all five rows succeed. The five rows (i.e. rows 1, 4, 7, 9-10) proceed to step 4. In step 4, row 1 fails. Step 4 is the last step of the save procedure in this embodiment.

At this point, it is noted that there have been one or more failures somewhere along steps 1 through 4 of the first attempt. Because there have been one or more failures, a rollback operation in the database is commanded, and the remaining rows (i.e. rows 4, 7, 9-10) are retried. In other words, rows 4, 7, and 9-10 are started through step 1 again. Even though all of these rows had previously went through all of the steps, it is still possible that some of them may now fail.

In the second attempt, all four rows (i.e. rows 4, 7, 9-10) are a success. The rows (i.e. rows 4, 7, 9-10) proceed to step 2. In step 2 of the second attempt, row 7 fails. The rest of the rows (i.e. rows 4, 9-10) proceed to step 3. In steps 3 and 4 of the second attempt, the rows are successful.

At this point, it is noted that there have been one or more failures somewhere along steps 1 through 4 of the second attempt. Because there have been one or more failures, a rollback operation is in the database is commanded, and the remaining rows (i.e. rows 4, 9-10) are retried.

In the third attempt, all three rows (i.e. rows 4, 9-10) are successful in every step. It is then concluded that the whole save process is successful for rows 4 and 9-10. Otherwise, another rollback would be commanded and another attempt made. This can occur repeatedly. In some embodiments, this process can be repeated only up until a preset maximum number of times.

That the rest of the rows proceed forward after a fault or faults are encountered at intermediate steps is optional. In some embodiments in which a rollback is commanded immediately, the end result is largely the same. However, rollbacks, which can be computationally expensive, may have to occur more often. In the embodiments described, all the rows that are considered successful have gone through every step successfully, and the pre/post-operation triggers were executed for those rows. In the exemplary embodiment, the triggers will not cause any side-effects based on rows other than rows 4 and 9-10.

Bulk processing techniques provided by embodiments described herein can extend to processing any of the following operations in bulk: (i) processing and packaging of the API messages themselves; (ii) internal object representation as a list of rows being operated upon; (iii) INSERT routines in PL/SQL; (iv) Lookup routines for de-duplicate matching when doing record updates; (v) UPDATE routines in PL/SQL for record changes; (vi) DELETE routines in PL/SQL; (vii) INSERT, UPDATE, DELETE routines include semantically complicated bookkeeping routines, all in bulk, such as: (a) MRU (most-recently used list) maintenance; (b) Row-level sharing maintenance; and (c) Entity store count maintenance; (viii) Reload of data after an update in preparation for performing post-save logic (known as workflow); and (ix) Workflow implementation itself, including the bulk queue and processing of tasks such as Email, child row creation, outbound SOAP messages, and the like. Each embodiment disclosed herein may be used or otherwise combined with any of the other embodiments disclosed. Any element of any embodiment may be used in any embodiment.

Recursive updating, inserting, and deleting of records in the database can also be supported. Recursion can help minimize conflicts, empty states, and other errors, which can be caused when user code that calls a save is triggered to execute during a save routine. Conflicts can occur when a record in a database is dependent on another record in the database. The record that depends from the other for a field's value can be called the parent record. The record that is depended from can be called the child record.

Figure 6A:
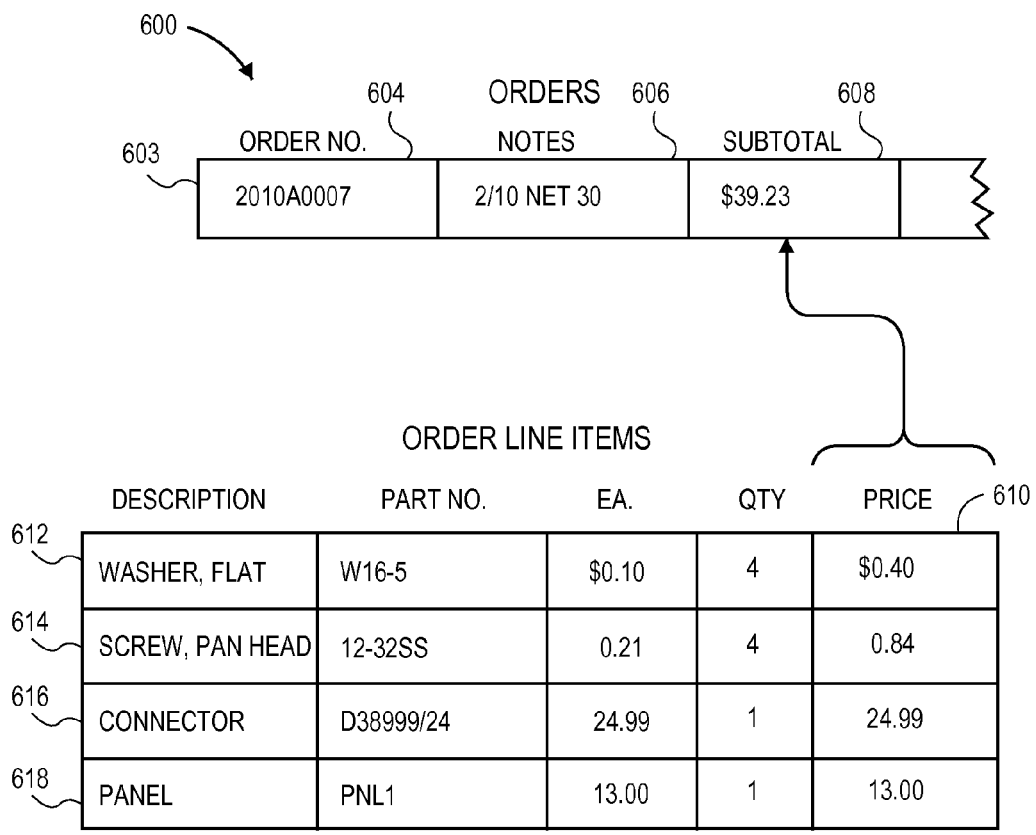
FIG. 6A illustrates a parent-child relationship between records in a database in accordance with an embodiment.

FIG. 6A illustrates a parent-child relationship between records in a database. In a database in the exemplary embodiment, a table of orders exists, called the "Orders" table. Parent record 603, in the table includes various fields, such as order number field 604, notes field 606, and subtotal field 608. Subtotal field 608 depends from records in another table of the database, called the "Order Line Items" table. The Order Line Items table includes price field 610, for which a price of an item is stored for each item in order line item records 612, 614, 616, and 618. Subtotal field 608, sometimes called a rollup summary field, sums the prices from price field 610.

If a value in price field 610 changes, then the sum of the values in subtotal field 608 should change. For example, if the price of each flat washer changes to $0.11, then price field 610 of order line item record 612 changes to $0.44, and subtotal field 608 changes to $39.27. Any number of dependencies can be made.

Figure 6B:
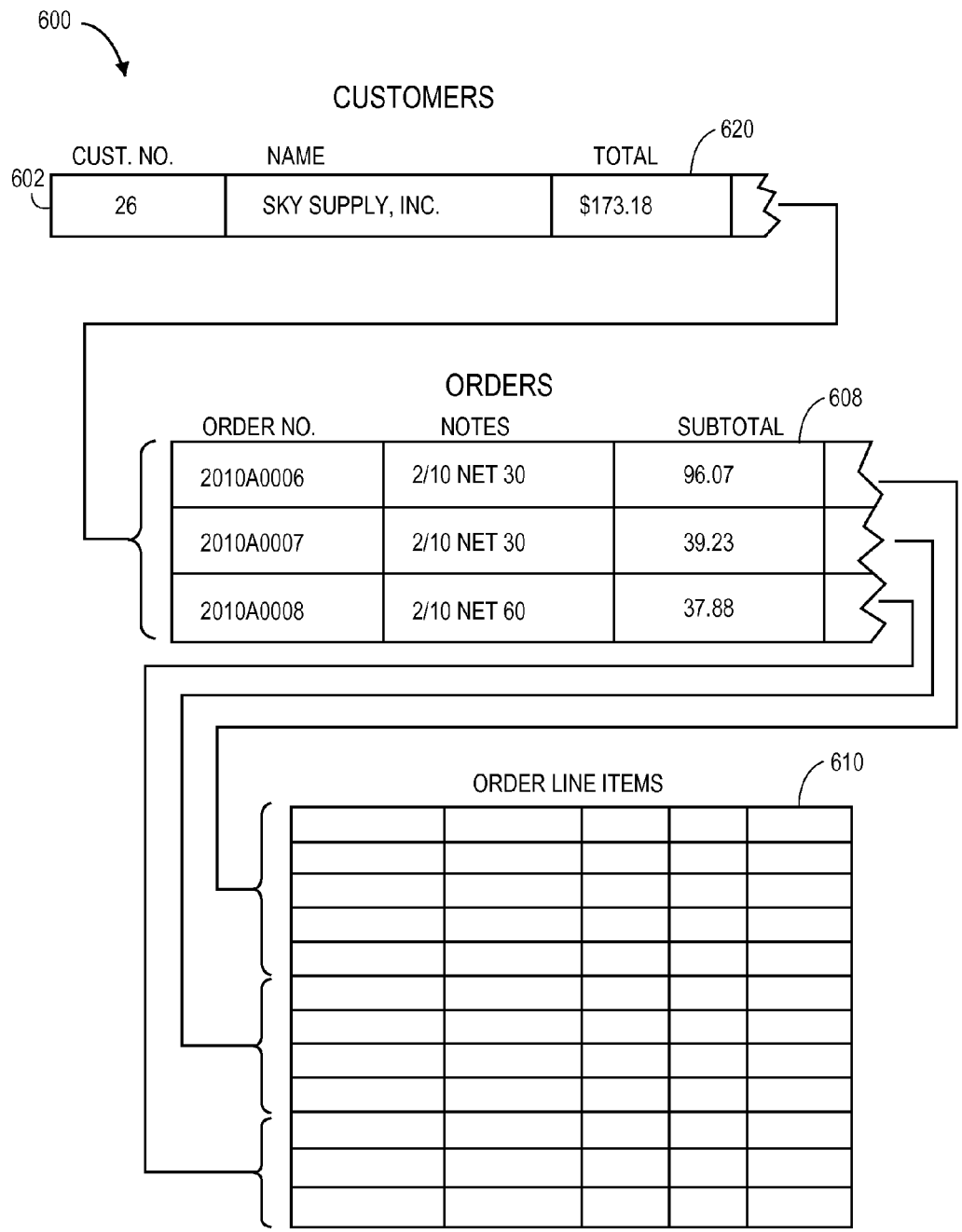
FIG. 6B illustrates a grandparent-parent-child relationship between records in a database in accordance with an embodiment.

FIG. 6B illustrates a grandparent-parent-child relationship between records in a database. In the exemplary embodiment, customer record 602 has field 620 that is dependent on the values in subtotal field 608 of the Orders table. Each value in subtotal field 608 is in turn dependent on the values in price field 610 of the Order Line Items table.

Figure 7:
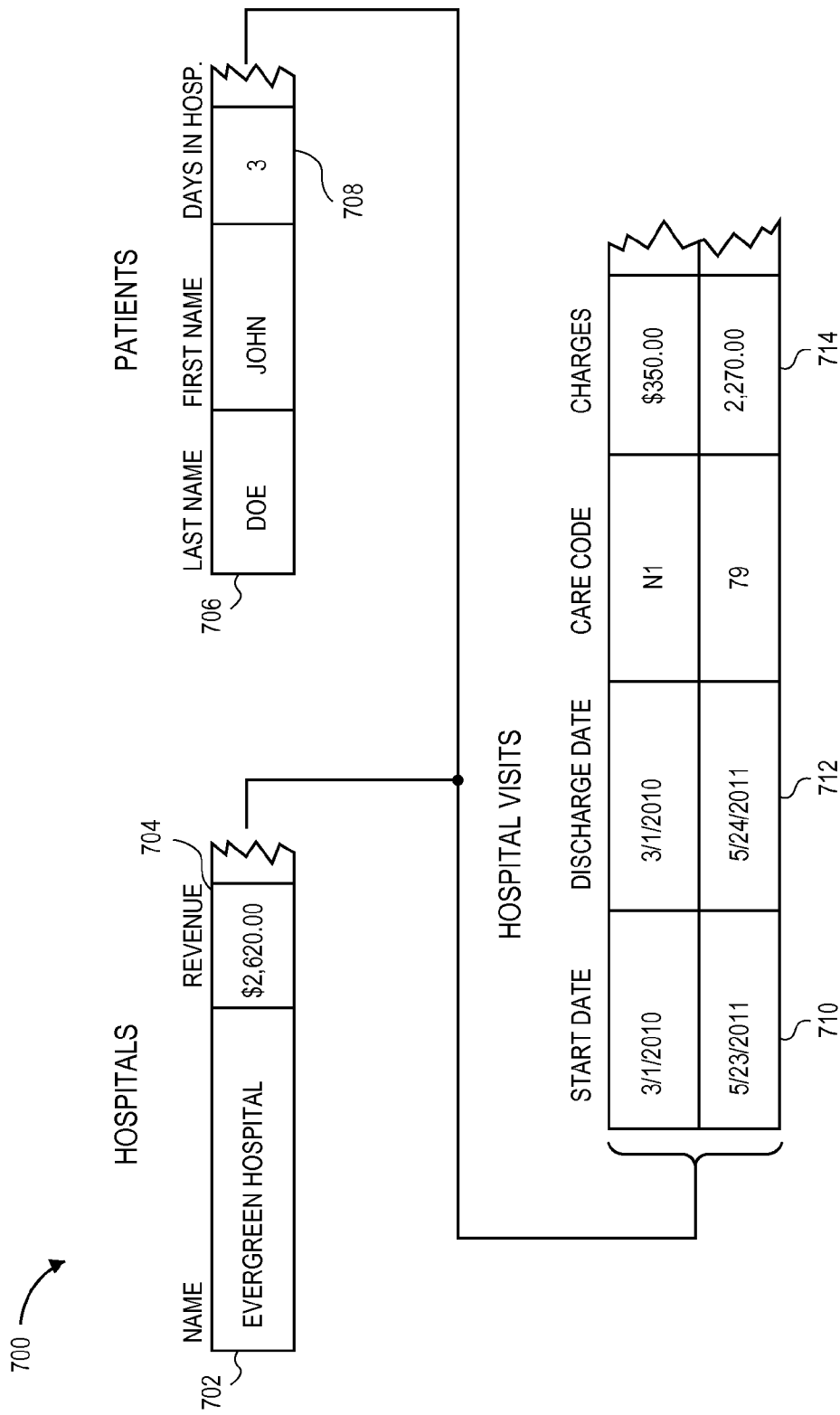
FIG. 7 illustrates a record having two parent records in a database in accordance with an embodiment.

FIG. 7 illustrates a child record having two parent records in a database. In a table called "Hospitals," revenue field 704 depends from charges field 714 in the "Hospital Visits" table. In a table called "Patients," days in hospital field 708 depends from start date field 710 and discharge date field 712 in the "Hospital Visits" table. Fields in different parents can depend from the same fields in the child. For example, a field totaling expenses for patient record 706 can depend from charges field 714 in the same way that revenue field 704 of hospital record 702 depends from the field.

Figure 8:
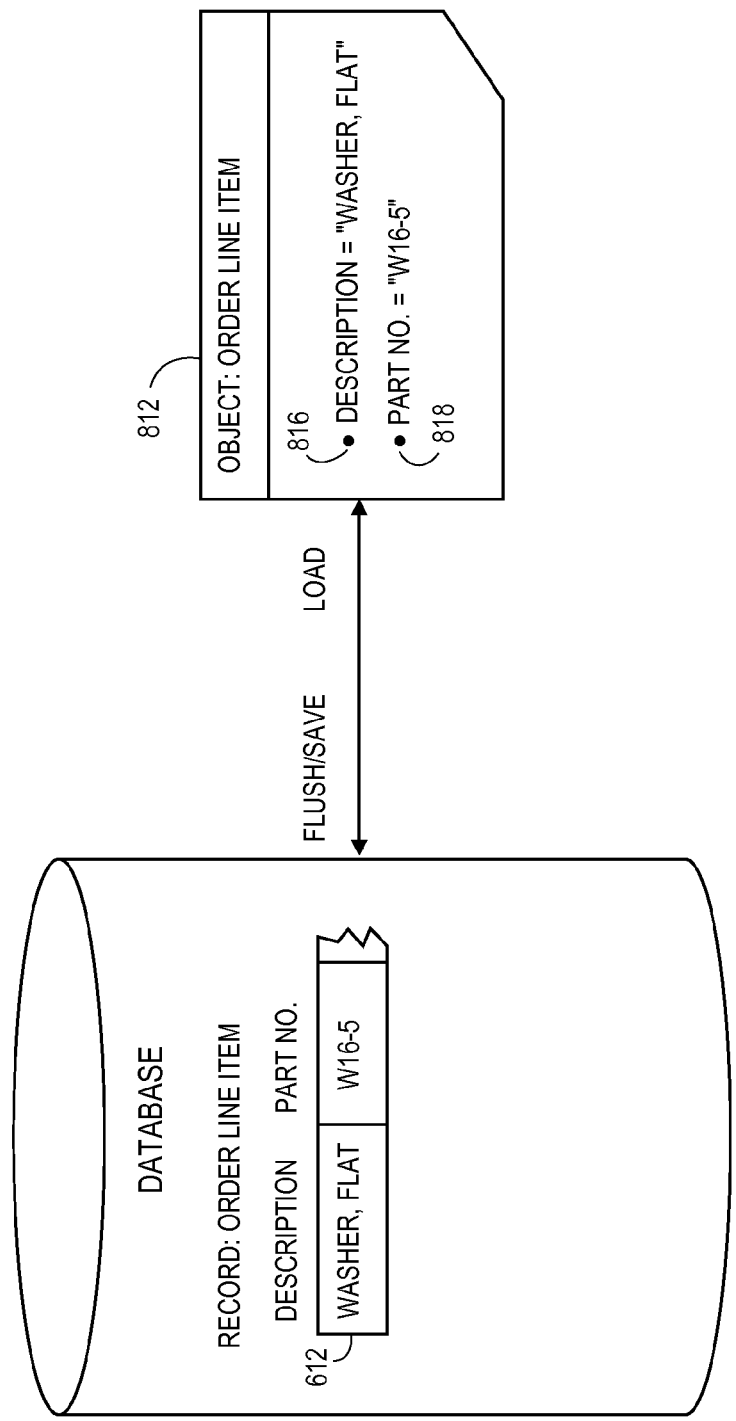
FIG. 8 illustrates a relationship between a database record and an object in accordance with an embodiment.

FIG. 8 illustrates a relationship between a database record, such as those in FIGS. 5-7, and an object. Order line item record 612 can be loaded into order line item object 812. That is, some or all of the values in order line item record 612 can be copied or moved into the properties or stored attributes of order line item object 812. For example, the description field of order line item record 612, which stores the string "WASHER, FLAT", is copied into description attribute 816. Similarly, the part number field of order line item record 612, which stores the string "W16-5", is copied into partno attribute 818. Stored properties and attributes in an object can be flushed or saved to database records. For example, description attribute 816 can be copied into the description field of order line item record 612 in the database.

Figure 9:
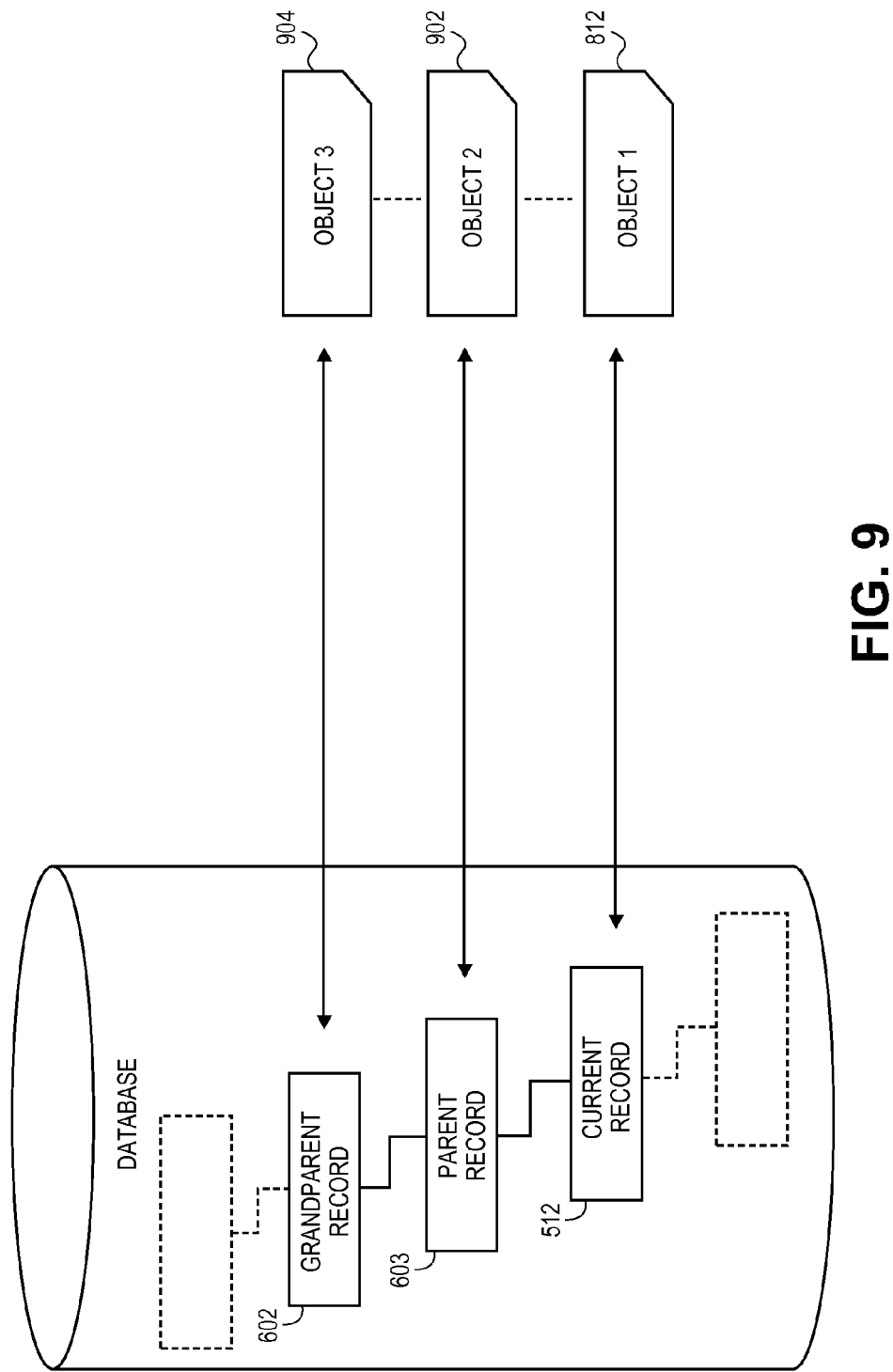
FIG. 9 illustrates a relationship between hierarchical database records and objects in accordance with an embodiment.

FIG. 9 illustrates a relationship between hierarchical database records and objects. Current record 512 has been copied to object1 812, parent record 603 has been copied to object2 902, and grandparent record 602 has been copied to object3 904. Because the underlying records in the database have dependencies and a hierarchy, the corresponding objects reflect the same dependencies and hierarchies. For example, object3 904 depends from object2 902, and object2 902 depends from object1 812.

An object that represents a record in a database that has two parent records is sometimes called a "junction object."

Embodiments can receive a value for a record in a database. This value can be entered from a user, calculated by a computer, or received from any source.

One can determine that a dependency exists between records in the database. This determination can be by lookup table, an analysis of dependencies, by scanning open objects, or other means.

A "direct" parent includes a parent with a dependency that is directly from a value in a field of the child. For example in FIG. 6A, subtotal field 608 of order record 603 depends directly from price field 610 of order line item records 612, 614, 616, and 618. Therefore, order field 603 is a direct parent of each order line item record 612, 614, 616, and 618.

Once can recursively determine that a dependency exists, recursively load, update, and flush an object. Recursion can be called to find grandparents, great-grandparents, etc. as well as children, grandchildren, great-grandchildren, etc.

"Recursion" includes processes in which a method, function, or other routine calls itself or exists in a chain of methods, functions, or other routines that calls itself. "Recursively" performing a function includes using recursion or by way of recursion. For example, recursively determining that a dependency exists for a grandparent record can include calling a check-for-dependent-parent routine while referring to a child record to find a parent record, then within the check-for-dependent-parent routine (or chain of routines) calling the same check-for-dependent-parent routine while referring to the parent record to find a grandparent record.

"Flushing" includes storing or otherwise saving information from an object into a record in a database. Sometimes the term flushing is used so that it is not confused with an overall saving routine that includes error checking, validations, user prompts, etc. Flushing can occur with the running of validations, pre-operation triggers, post-operation triggers, and other operations. These other operations are capable of generating errors or other faults.

User-supplied code is any software code entered, configured, or otherwise presented by a user. A user can include an end user, technician, system administrator, or any other person.

Validation rules include any rules that perform validation checking functions. For example, a validation rule for a part number may include a rule that the part number cannot be an empty string (i.e., " "). As another example, a validation rule for a price may include a rule that the price must be positive and have a maximum of two digits to the right of a decimal point (i.e., increments of 0.01).

A "workflow" is a configuration that enforces business rules on information in a system given the passing of certain conditions. Workflows can include rules such as assignment rules, auto-response rules, workflow rules, and case escalation rules. For example, a workflow can include that an email be sent if an order greater than a predetermined value is entered.

Figure 10:
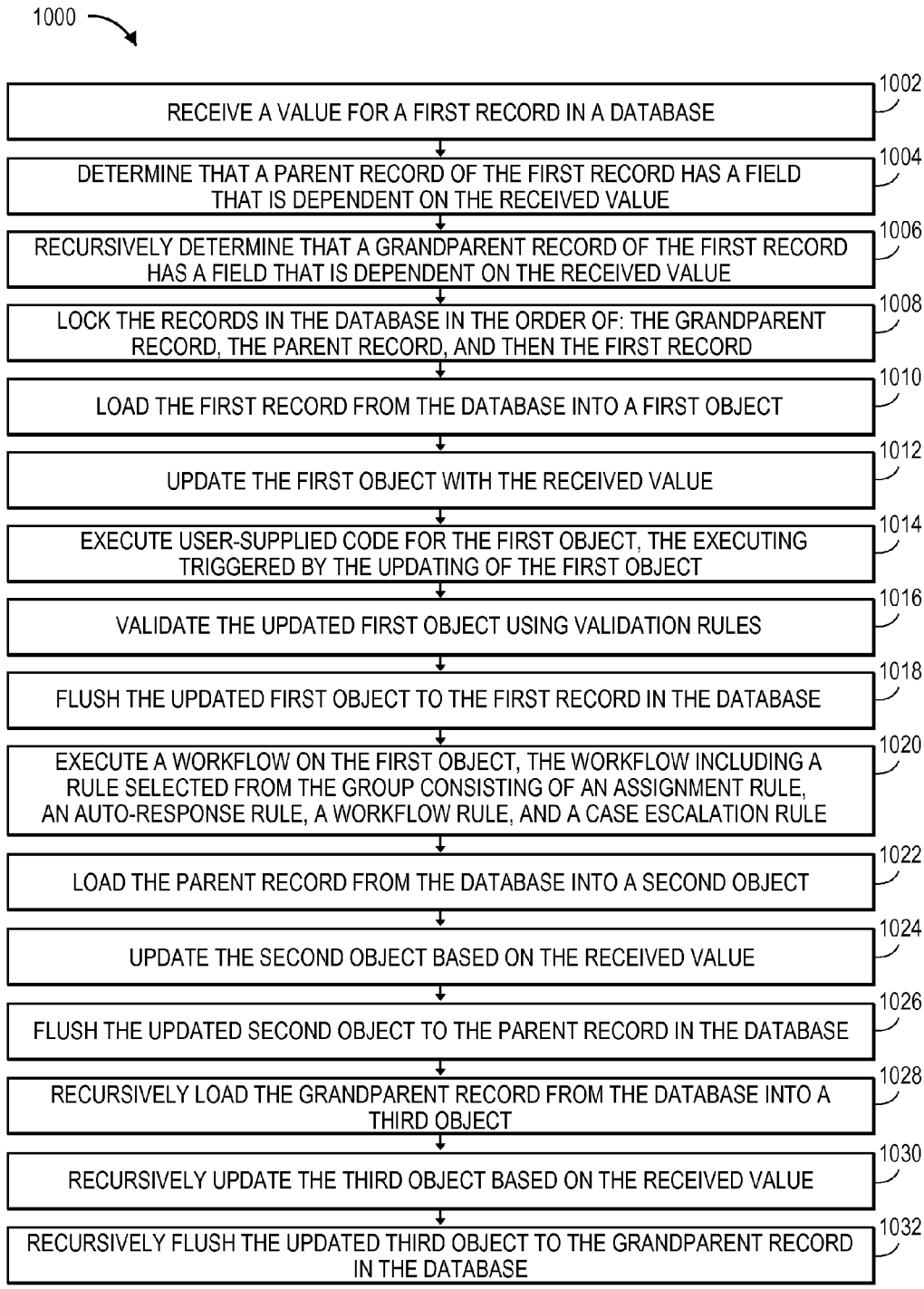
FIG. 10 is a process diagram in accordance with an embodiment.

FIG. 10 is a flowchart illustrating a process 1000 in accordance with an embodiment. Process 1000 can be automated in a computer or other machine and can be coded in software, firmware, etc. In operation 1002, a value is received for a first record in a database. In operation 1004, it is determined that a parent record of the first record has a field that is dependent on the received value. In operation 1004, it is recursively determined that a grandparent record of the first record has a field that is dependent on the received value. In operation 1008, the records in the database are locked in the following order: the grandparent record, the parent record, and then the first record. In operation 1010, the first record from the database is loaded into a first object. In operation 1012, the first object is updated with the received value. In operation 1014, user-supplied code is executed for the first object. The executing is triggered by the updating of the first object. In operation 1016, the updated first object is validated using validation rules. In operation 1018, the updated first object is flushed to the first record in the database. In operation 1020, a workflow is executed on the first object. The workflow includes an assignment rule, an auto-response rule, a workflow rule, or a case escalation rule. In operation 1022, the parent record is loaded from the database into a second object. In operation 1024, the second object is updated based on the received value. User-supplied code can be executed for the second object. The executing can be triggered by the updating of the second object. The updated second object can then be validated using validation rules. In operation 1026, the updated second object is flushed to the parent record in the database. A workflow can be executed on the second object. In operation 1028, the grandparent record is recursively loaded from the database into a third object. In operation 1030, the third object is recursively updated based on the received value. User-supplied code can be executed for the third object. The executing can be triggered by the updating of the third object. The updated third object can then be validated using validation rules. In operation 1032, the updated third object is recursively flushed to the grandparent record in the database. A workflow can be executed on the third object.

Figure 11:
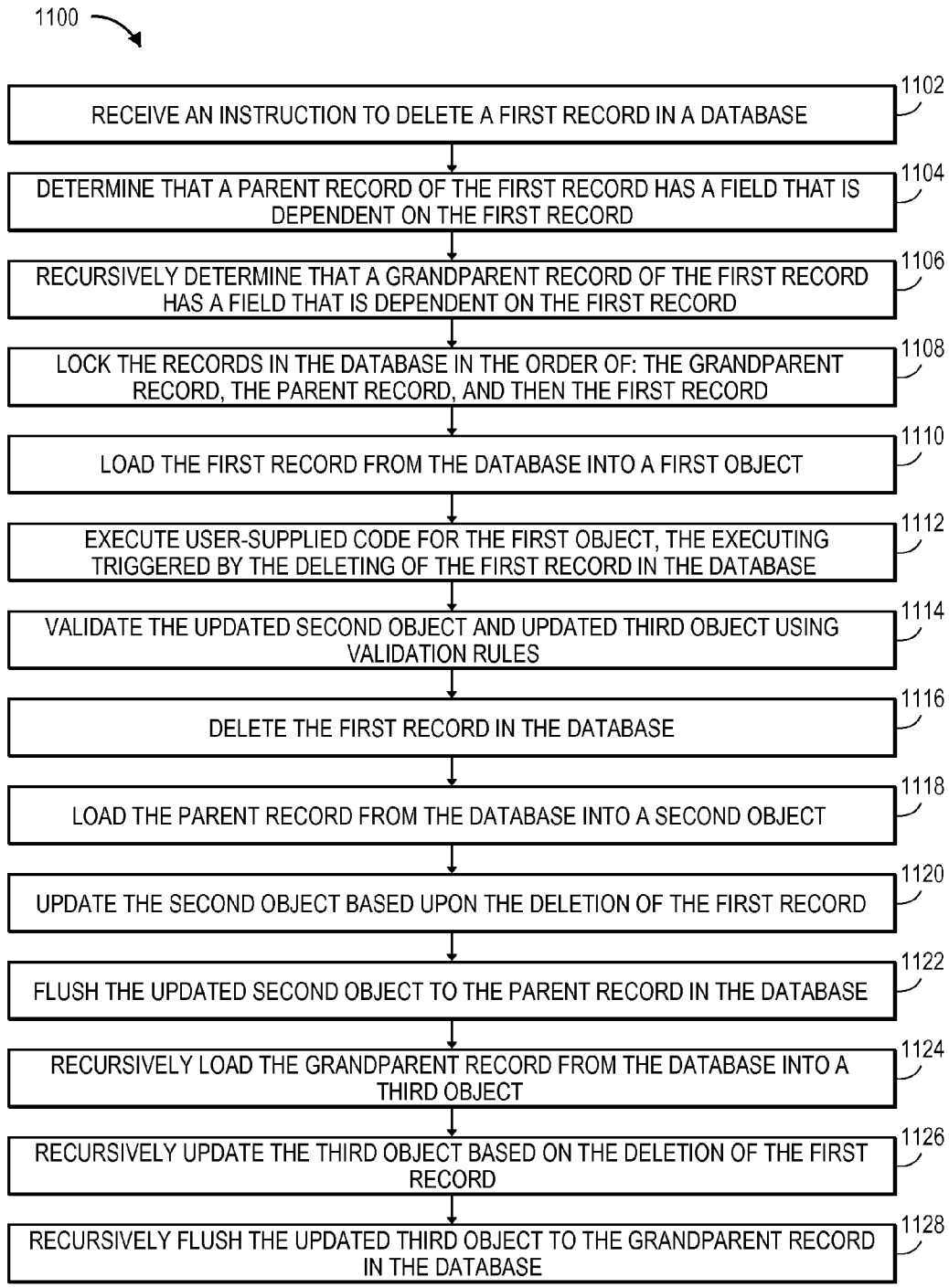
FIG. 11 is a process diagram in accordance with an embodiment.

FIG. 11 is a flowchart illustrating a process in accordance with an embodiment. In operation 1102, an instruction is received to delete a first record in a database. In operation 1104, it is determined that a parent record of the first record has a field that is dependent on the first record. In operation 1106, it is recursively determined that a grandparent record of the first record has a field that is dependent on the first record, through the parent record. In operation 1108, the records in the database are locked in the order of: the grandparent record, the parent record, and then the first record. In operation 1110, the first record from the database is loaded into the first object. In operation 1112, user-supplied code is executed for the first object. The executing is triggered by the deleting of the first record in the database. In operation 1114, the updated second object and updated third object are validated using validation rules. In operation 1116, the first record in the database is deleted. In operation 1118, the parent record is loaded from the database into a second object. In operation 1120, the second object is updated based upon the deletion of the first record. In operation 1122, the updated second object is flushed to the parent record in the database. In operation 1124, the grandparent record is recursively loaded from the database into a third object. In operation 1126, the third object is recursively updated based on the deletion of the first record. In operation 1128, the updated third object is recursively flushed to the grandparent record in the database.

FIG. 12 is a flow diagram illustrating faults during steps according to an embodiment. This embodiment adds step 5 to the embodiment of FIG. 5. Step 5 is a recursive save of the parent. If a fault is encountered while recursively saving a parent of a row, the fault is then placed on each of the objects that originally cause the parent to be recursively saved.

FIG. 13A illustrates rows 4 and 9 belonging to parent row 11. FIG. 13B illustrates row 10 belonging to parent row 12.

During step 5 while saving rows 11 and 12, a fault is encountered for row 11. This will place a fault on both row 4 and 9. The fault on row 11 may be caused by the changes of 4 alone, the changes of 9 alone, or the changes of both together. In the embodiment it does not matter which row caused the fault, just that both children rows 4 and 9 are attributed a fault. The save operation is then rolled back and retried with only row 10.

Some embodiments are not limited to object-parent and object-parent-grandparent relationships. Embodiments using recursion can apply to object-parent-grandparent-great-grandparent relationships, object-parent-grandparent-great-greatgrandparent relationships, and so on.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method at a database system having at least a memory and a processor therein, wherein the method comprises:
processing a set of records to be committed to the database system;
detecting a fault with a record within the set of records while processing the set of records to be committed to the database system;
performing fault recovery for the record having the fault, including at least:
(i) determining the record having the fault is a parent record which depends from a field value of a child record,
(ii) faulting the child record,
(iii) identifying resource limitations counted against governor limits used up by processing the set of records including the record having the fault and the faulted child record,
(iv) rolling back the identified resource limitations associated with the record having the fault and the faulted child record, and
(v) removing the record having the fault and the faulted child record from the set of records to be committed to the database system resulting in subset of the set records to be committed to the database system; and
committing the resulting subset of the set records to be committed to the database system.

2. The method of claim 1, further comprising:
recursively removing any faulting records from the set records to be committed to the database system, including removing the record having the fault and the child record having the fault applied thereto, from the set of records to be committed to the database system until a resulting subset of the set records to be committed to the database system is processed without faulting; and
wherein committing the resulting subset of the set records comprises committing the resulting subset having any faulting records removed therefrom.

3. The method of claim 1, wherein determining the record having the fault is a parent record which depends from a field value of a child record, comprises:
encountering the fault while recursively saving the record as a parent of the child record, and placing the fault on the child record originally causing the parent to be recursively saved.

4. The method of claim 1:
wherein the parent record depends from the field value of the child record and depends further from a second child record; and
wherein performing the fault recovery further includes faulting the second child record and removing the second child record from the set records to be committed to the database system.

5. The method of claim 1:
wherein the child record to the parent record constitutes a relationship selected from at least one of the following:
an object-parent relationship;

an object-parent-grandparent relationship;
an object-parent-grandparent-great-grandparent relationship; and
an object-parent-grandparent-greatgreatgrandparent relationship.

6. The method of claim 1, wherein determining the record having the fault is a parent record which depends from a field value of a child record further includes:
recursively determining that a grandparent record of the child record has a field that depends from a field value of the child record through the parent record.

7. The method of claim 6, wherein performing the fault recovery further includes locking records in the database system in the order of the grandparent record, the parent record, and then the child record.

8. The method of claim 1:
wherein processing the set of records to be committed to the database system includes executing user-supplied code for an object associated with the record having the fault; and
wherein performing the fault recovery further includes flushing the object associated with the record having the fault and rolling back any resource limitations associated with the executing user-supplied code for the object associated with the record having the fault.

9. The method of claim 8:
wherein detecting the fault includes validating the object using validation rules.

10. The method of claim 1, wherein processing the set of records to be committed to the database system includes updating the record determined to have the fault, wherein the updating for the record determined to have the fault includes at least one of:
processing for recursively deleting a record that is part of a hierarchy in a database system object and having a relationship to the record determined to have the fault;
processing for deleting the record having the fault from the database system;
processing for loading a parent object associated with the record having the fault into a second object;
processing for loading the parent object associated with the record having the fault into the second object based on the processing for deleting the record having the fault from the database system; and
processing for recursively loading a grandparent object from one or more child, grandchild, or greatgrandchild objects.

11. The method of claim 1, further comprising:
receiving a value for the child record;
wherein determining the record having the fault is a parent record which depends from a field value of a child record comprises determining the parent record is dependent on the received value for the child record;
recursively determining that a grandparent record to the child record has a field that is dependent on the received value for the child record;
loading the child record into an object;
updating the object with the received value for the child record; and
wherein performing the fault recovery further includes flushing the object having been updated with the received value for the child record.

12. The method of claim 1, further comprising:
receiving a value for the child record;
determining a second parent record to the child record depends from the field value of the child record, such that the child record has at least two parent records;
loading each of the two parent records to the child record into an object;
updating the object with the received value for the child record; and
wherein performing the fault recovery further includes flushing the object having been updated with the received value for the child record.

13. The method of claim 1, further comprising:
using recursion to recursively load, update, and flush objects corresponding to a great-grandparent record and other records related to the child record.

14. The method of claim 1, further comprising:
executing a workflow on an object corresponding to the record having the fault or the child record, or both, the workflow including a rule selected from the group consisting of an assignment rule, an auto-response rule, a workflow rule, and a case escalation rule.

15. The method of claim 1, wherein the database system operates as an on-demand database service on behalf of a plurality of tenants of a Multi-Tenant Database system implemented via the database system, the on-demand database service being accessible to the plurality of tenants via a global Internet network.

16. The method of claim 15, wherein the on-demand database service is accessible to the plurality of tenants via a web-based interface configured to:
execute software applications;
provide data, code, forms, and webpages to and from user systems communicably interfaced with the on-demand database service; and
store and retrieve data, objects, and Webpage content on behalf of the user systems communicably interfaced with the on-demand database service.

17. The method of claim 1:
wherein the database system stores data on behalf of a plurality of tenants of a Multi-Tenant Database system implemented via the database system; and
wherein the data for multiple tenants is stored within a same physical database object of the database system and is arranged such that data of one tenant is kept logically separate from data of other tenants, wherein the one tenant does not have access to the data of the other tenants unless the data of the other tenants is expressly shared.

18. The method of claim 1:
wherein the database system implements a Multi-Tenant Database system having therein elements of hardware and software that are shared by a plurality of customers of the Multi-Tenant Database system; and
wherein the Multi-Tenant Database system includes application servers which operate on behalf of the plurality of customers, each capable to simultaneously process requests on behalf of multiple of the plurality of customers.

19. Non-transitory computer readable storage media having instructions stored thereupon that, when executed by a processor of a database system, the instructions cause the database system to perform operations including:
processing a set of records to be committed to the database system;
detecting a fault with a record within the set of records while processing the set of records to be committed to the database system;
performing fault recovery for the record having the fault, including at least:
(i) determining the record having the fault is a parent record which depends from a field value of a child record, (ii) faulting the child record, (iii) identifying resource limitations counted against governor limits used up by processing the set of records including the record having the fault and the faulted child record, (iv) rolling back the identified resource limitations associated with the record having the fault and the faulted child record, and (v) removing the record having the fault and the faulted child record from the set of records to be committed to the database system resulting in subset of the set records to be committed to the database system; and committing the resulting subset of the set records to be committed to the database system.

20. The non-transitory computer readable storage media of claim 19, further comprising:

recursively removing any faulting records from the set records to be committed to the database system, including removing the record having the fault and the child record having the fault applied thereto, from the set of records to be committed to the database system until a resulting subset of the set records to be committed to the database system is processed without faulting; and wherein committing the resulting subset of the set records comprises committing the resulting subset having any faulting records removed therefrom.

21. The non-transitory computer readable storage media of claim 19, wherein determining the record having the fault is a parent record which depends from a field value of a child record, comprises:

encountering the fault while recursively saving the record as a parent of the child record, and placing the fault on the child record originally causing the parent to be recursively saved.

22. The non-transitory computer readable storage media of claim 19, further comprising:

receiving a value for the child record;

wherein determining the record having the fault is a parent record which depends from a field value of a child record comprises determining the parent record is dependent on the received value for the child record;

recursively determining that a grandparent record to the child record has a field that is dependent on the received value for the child record;

loading the child record into an object;

updating the object with the received value for the child record; and wherein performing the fault recovery further includes flushing the object having been updated with the received value for the child record.

23. A database system, comprising:

a memory;

one or more processors;

a physical database object to store a plurality of records; and one or more sequences of instructions that when executed cause the one or more processors to:

(i) process a set of records to be committed to the database system;

(ii) detect a fault with a record within the set of records while processing the set of records to be committed to the database system;

(iii) perform fault recovery for the record having the fault via (a) instructions to determine the record having the fault is a parent record which depends from a field value of a child record, (b) instructions to fault the child record, (c) instructions to identify resource limitations counted against governor limits used up by processing the set of records including the record having the fault and the faulted child record, (d) instructions to roll back the identified resource limitations associated with the record having the fault and the faulted child record, and (e) instructions to remote the record having the fault and the faulted child record from the set of records to be committed to the database system resulting in subset of the set records to be committed to the database system, and (iv) commit the resulting subset of the set records to be committed to the database system.

24. The database system of claim 23:

wherein the database system is to operate as an on-demand database service on behalf of a plurality of tenants of a Multi-Tenant Database system implemented via the database system, the on-demand database service being accessible to the plurality of tenants via a global Internet network.

wherein the database system stores data on behalf of the plurality of tenants within the physical database object, the data arranged such that data of one tenant is kept logically separate from data of other tenants, wherein the one tenant does not have access to the data of the other tenants unless the data of the other tenants is expressly shared;

wherein the Multi-Tenant Database system includes elements of hardware and software that are shared by the plurality of tenants of the Multi-Tenant Database system; and wherein the Multi-Tenant Database system includes application servers which operate on behalf of the plurality of tenants, each capable to simultaneously process requests on behalf of multiple of the plurality of tenants.

* * * * *